United States Patent [19]
Moss

[11] Patent Number: 4,760,891
[45] Date of Patent: Aug. 2, 1988

[54] WHEEL MOTOR COVER

[76] Inventor: Michael D. Moss, P.O. Box 582, Kearny, Ariz. 85237

[21] Appl. No.: 9,799

[22] Filed: Feb. 2, 1987

[51] Int. Cl.$^4$ .............................................. B60K 7/00
[52] U.S. Cl. .................................. 180/65.5; 180/68.1; 150/54 B; 301/37 H
[58] Field of Search ...................... 180/10, 65.5, 68.1; 24/133, 134 R, 270, 273, 530; 310/89; 150/54 B, 54 A; 301/6 D, 6 US, 37 R, 37 H

[56] References Cited

U.S. PATENT DOCUMENTS

| | | | |
|---|---|---|---|
| 1,472,033 | 10/1923 | Anderson | 150/54 B |
| 1,495,665 | 5/1924 | Bigelow et al. | 150/54 B |
| 1,625,593 | 4/1927 | Cross | 24/134 R |
| 2,453,492 | 11/1948 | Carter | 24/270 |
| 2,682,937 | 7/1954 | Lyon | 301/6 CS |
| 3,161,249 | 12/1964 | Bouladon et al. | 180/10 |
| 4,040,582 | 8/1977 | Krauss | 301/37 H |
| 4,620,749 | 11/1986 | McEachern | 301/37 H |

FOREIGN PATENT DOCUMENTS 1382425  1/1975  United Kingdom .............. 180/65.5

Primary Examiner—David M. Mitchell
Assistant Examiner—Brian L. Johnson
Attorney, Agent, or Firm—Cahill, Sutton & Thomas

[57] ABSTRACT

A cover for an electric motor in a vehicle wheel permits cooling air to be expelled from the motor but prevents foreign material from entering the motor. The cover is made of flexible, air and water impervious sheet material and has a disc-like configuration to fit an opening in the wheel at the cooling air exit from the motor. The cover has one or more openings therein sized to permit the desired flow of cooling therethrough. Each such opening is preferably covered by a foramenous material, such as scrim, to prevent foreign material from passing therethrough. Each such opening also is loosely covered with an impervious sheet, deflecting cover to keep precipitation away from the opening. A reinforcing wire attached to the perimeter of the cover has its circumference expanded by a toggle mechanism to facilitate attachment and removal of the cover.

9 Claims, 1 Drawing Sheet

WHEEL MOTOR COVER

TECHNICAL FIELD

This invention is concerned with protecting electric motors in the wheels of electrically propelled haulage trucks.

BACKGROUND ART

Heavy duty off-highway trucks utilized in mining and other excavating operations often are propelled by electric motors contained within a pair or more of the wheels of the vehicle. Electricity for the motors is usually provided by a diesel engine driven alternator, or generator, also on board the vehicle Vehicles thus propelled are very powerful, rugged and yet easily controlled by an operator.

The environment of the off-highway haulage truck is difficult. The trucks are subjected to severe strains as they are loaded and unloaded and collisions with loading rigs and equipment and other obstacles are not uncommon. These trucks encounter severe dust conditions and often have debris rained on them. And, of course, they operate outdoors so they are subjected to precipitation.

Electric motors must be ventilated to carry away heat generated therein. Thus, there must be a path for cooling air to exit the motor to the atmosphere. With wheel motors this exit path is generally through the hub region of the wheel of the vehicle. Any path open to the flow of cooling air is a potential path for debris and other foreign material, such as dust and water, to enter the motor. Such entry is obviously undesirable, so it is common practice to provide a cover over the cooling air exit of the wheel motor. In the past these covers have been fabricated from metal or rigid plastic materials and held in place by various means, such as detachable clasps. Despite these covers being constructed to possess great strength, they have invariably been damaged, dislodged and destroyed in the difficult environment of the off-highway truck. As a result, motor covers of prior designs have been the cause of costly maintenance problems for operators of the trucks. Because it was often not possible to repair damage to these prior covers, replacements had to be procured from the manufacturer. Any delay in obtaining a replacement cover resulted in down time on very expensive equipment.

DISCLOSURE OF INVENTION

This invention contemplates a wheel motor cover which is resistent to the abuses to which the off-highway haulage truck is subjected. Consequently, the cover is capable of providing reliable, trouble-free protection for the electric motor with which it is associated. Possibly the most significant feature of this cover is that it is made from flexible sheet material, such as rubber or plastic impregnated fabric, which resists damage when run into by another vehicle or subjected to a hail of debris. The cover has a reinforcing member secured to its perimeter and which can have its circumference expanded or contracted by means attached to the reinforcing member. Manipulation of the circumference of the reinforcing member permits the perimeter of the cover to be firmly sealed against a flanged region of the wheel hub to hold the cover in place and to permit its removal for replacement. The cover has one or more openings therein to permit cooling air to be expelled from the motor. Foramenous sheets over the cover openings discourage the entry of foreign materal into the motor through those openings. In one of the preferred embodiments of the invention the cover openings are also loosely covered by impervious deflection covers to preclude precipitation from reaching the motor.

BRIEF DESCRIPTION OF THE DRAWING

The invention is described in greater detail hereinafter by reference to the accompanying drawing wherein.

BEST MODE FOR CARRYING OUT THE INVENTION

Figure 1:
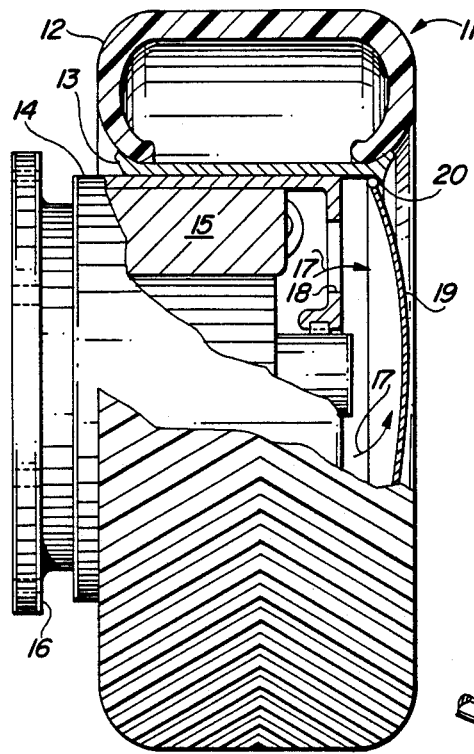
FIG. 1 is an elevational view, partially in section, of a truck wheel having an electric motor associated therewith; the motor is schematically illustrated.

Referring particularly to FIG. 1, the numeral 11 designates generally a wheel-motor combination of a type commonly used on electrically propelled off-highway haulage trucks. The wheel-motor combination includes a pheumatic tire 12 mounted on a flanged rim 13 which, in turn, is mounted on a rotatable housing 14 for the motor 15. Housing 14 serves, in effect, as a hub for the wheel portion of the combination which comprises rim 13 and tire 12. The wheel-motor combination 11 is usually mounted on the vehicle by means of bolts (not shown) passing through a flanged portion 16 which carries motor 15.

Motor 15 is illustrated only schematically in FIG. 1. A typical motor drive arrangement well known in the art may have a system of reduction gearing built into the motor unit. Because such construction details play no part in the present invention and are not essential for an understanding of the invention, they have been ommitted to simplify the drawing.

The removal of heat generated by electrical losses in the motor 15 is effected by flowing cooling air through the motor housing 14 as indicated by arrows 17 in FIG. 1. It will be noted that rotatable housing 14 of motor 15 has openings 18 therein to permit the cooling air to be expelled from motor 15. This cooling air exits to atmosphere in the hub region of the wheel-motor combination 11. This same open path for cooling air flow could, of course, permit the ingress to the motor of undesirable foreign material from outside the wheel-motor 11. To prevent this from happening the hub region of the wheel is equipped with a cover 19. In the construction illustrated in FIG. 1 cover 19 is sealed and seated against a flanged region 20 at the outer edge of wheel rim 13.

Figures 2, 6:
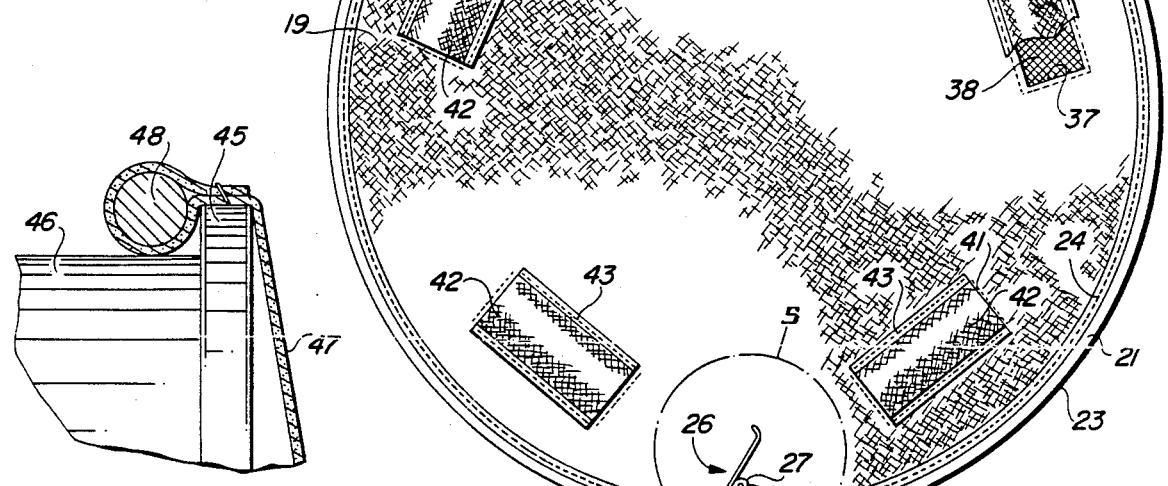
FIG. 2 is an elevational view of the face of a motor cover constructed in accordance with this invention; portions of the figure are broken away.
FIG. 6 is a partial elevational view, partly in section, illustrating a modified mounting arrangement for the cover of this invention.

Cover 19 serves a dual function. It is intended to inhibit the ingress of foreign material to the motor 15 and it also serves to control the flow of cooling air through the motor 15. A cover 19 performing these two functions is illustrated in greater detail in FIGS. 2, 3 and 4. Cover 19 is configured to cover the air flow opening in the hub region of the wheel-motor combination 11 and for most installations will be disc-shaped as shown in FIG. 2. Cover 19 is made from air and liquid impervious flexible material. Rubber impregnated, woven nylon fabric has been determined to be particularly suited for this application because of its impervious character, its high degree of flexibility, its strength, and its resistance to scuffing and tearing. Other materials having these characteristics are suitable for fabrication of cover 19.

Cover 19 preferably has a reinforcing member 21 attached to its perimeter. Reinforcing member 21 can take the form of a loop of wire 22 contained within a fabric welt 23 stitched to the perimeter of cover 19 by a row of stitching 24 (See FIG. 3).

Figure 5:
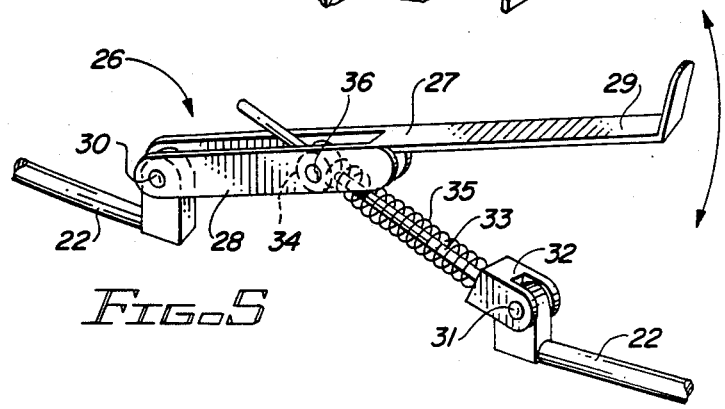
FIG. 5 is an enlarged perspective view of an over-center toggle mechanism employed in the cover in the region indicated by circle 5 in FIG. 2.

Cover 19 is preferably equipped with means, indicated generally by reference numeral 26, for altering the configuration of reinforcing member 21 to cause the perimeter of cover 19 to tightly engage the flanged region 20 of the wheel-motor combination 11. This means is illustrated in FIGS. 2 and 5 and comprises an over-center toggle mechanism 27 attached to the ends of wire 22 for increasing and decreasing the circumference of reinforcing member 21. As best shown in FIG. 5, toggle mechanism 27 comprises a split toggle link 28 movable by means of a handle 29 about a pivot 30 provided at one end of the loop of wire 22. The other free end of the loop of wire 22 has pivotally attached thereto at pivot 31 a yoke 32. This yoke 32 carries a rod 33 which slidingly passes through a pivotally mounted cylinder 34 in toggle link 28. The toggle mechanism 27 is completed by a compression spring 35 carried on rod 33 and adapted to bias yoke 32 away from cylinder 34.

Movement of handle 29 of the toggle mechanism 27 in a counterclockwise direction about pivot 30 has the effect of relieving the compression of spring 35 and allows the two ends of the loop of wire 22 to come close together to reduce the circumference of the wire loop and the reinforcing member 21. Conversely, movement of handle 29 in a clockwise direction has the effect of compressing spring 35 between cylinder 34 and yoke 32, thereby producing a bias which tends to separate the ends of loop wire 22. This increases the circumference of the reinforcing member 21. When handle 29 is moved sufficiently to move the pivotal axis 36 of cylinder 34 past an imaginary line between pivots 30 and 31 the mechanism assumes an over-center, or locked condition in which the loop of wire 22 and reinforcing member 21 are kept in their expanded conditions. It can be appreciated that when the cover 19 is installed in the wheel-motor combination 11 in the vicinity of the flanged region 20 of rim 13 as shown in FIG. 1, the forces tending to increase the diameter of reinforcing member 21 have the effect of sealing the perimeter of the cover 19 against rim 13 and hold the cover in place on the wheel-motor 11. The cover 19 is held in place with sufficient force to resist any tendency for the cover to become dislodged as the wheel rotates. The attachment is also sufficient to prevent the cooling air flowing from the motor 15 from dislodging the cover 19.

Cover 19 must, of course, permit cooling air to exit from motor 15 to the exterior of wheel-motor 11. For this purpose the cover 19 is provided with one or more openings 37 in the face thereof. The size and number of openings 37 are selected to admit of the desired rate of cooling air flow through the motor 15 at the pressure supplied by the blower mechanism (not shown) provided in the truck. It is customary in diesel electric off-highway trucks to provide a common blower for delivering cooling air to the alternator and to the several wheel-motor combinations 11. In order to ensure that this cooling air will be distributed properly throughout the system to the alternator and to all of the wheel motors 15, the air flow openings 37 in the motor covers 19 are selected to provide some resistance to air flow therethrough. The calculation of the desired size and number of openings 37 for the cover 19 is well within the skill of the ordinary designer of this type of equipment.

Figure 4:
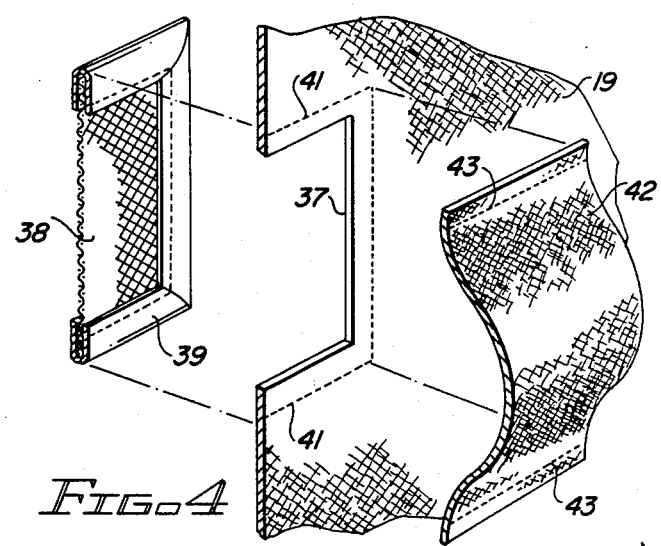
FIG. 4 is an exploded sectional view through the cover taken generally as indicated by line 4—4 in FIG. 2.

In accordance with this invention each air flow opening 37 in cover 19 is equipped with means for inhibiting the entry of foreign material through those openings to the motor 15. As shown in FIGS. 2 and 4 the openings are equipped with two such protective measures. In the first place, each opening 37 is covered with a sheet of foramenous material 38. A loose scrim of monofilimant nylon has been ascertained to be particularly suitable for this purpose. If desired, it can be bound at its edges as indicated at 39 to prevent the scrim from becoming unraveled. Foramenous material 38 is preferably stitched, as indicated at 41 to material forming the cover 19 surrounding each opening 37. Foramenous material 38 prevents coarse material from entering and damaging motor 15.

Each opening 37 in cover 19 is also preferably provided with a loose fitting, deflecting cover 42 to prevent precipitation from entering openings 37. Again referring to FIGS. 2 and 4, each deflecting cover 42 is preferably formed from an arched sheet of water impervious material. Covers 42 can, for example, be made of the same material as the cover 19; a rubber impregnated nylon fabric being preferred. Each deflecting cover 42 is held in place by stitching 43 along its longitudinal edges. The ends of each deflecting cover 42 are open to permit the free flow of cooling air from beneath the cover.

From the foregoing it should be apparent that the openings 37 and the protective covers 38 and 42 on cover 19 allow the cover 19 to perform its dual function of controlling the flow of cooling air exiting the motor 15 and protecting the motor from the ingress of undesirable foreign materials. Moreover, because of the flexibility and tear resistance of the cover 19 it is unlikely to be damaged by collisions with other vehicles or other obstacles or by materials raining down on the truck.

In the event a cover 19 is damaged, its repair and replacement is a relatively simple matter. Over-center toggle mechanism 27 is released to reduce the circumference of retaining member 21 thereby permitting the cover to be removed from wheel rim 13. Either pivot 30 or 31 of the toggle mechanism is provided in the form of a removable pin, such as a cotter pin, to free the roggle mechanism from one of the free ends of the loop of wire 22. When this is done and when the old fabric portion of cover 19 is removed a new fabric portion can be installed by feeding the wire loop 22 through the welt 23 on the new cover 19. The new cover 19 can then be placed on the wheel-motor combination 11. This entire sequence of events is accomplished in only a matter of minutes.

Figure 3:
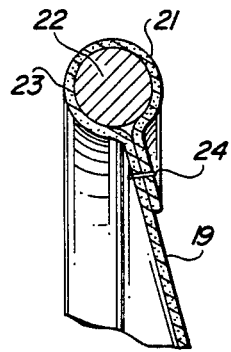
FIG. 3 is a sectional view through the perimeter of the cover taken generally as indicated by line 3—3 in FIG. 2.

In the mode for carrying out the invention described above it is intended that cover 19 be held in place by expanding the circumference of its perimeter against flange region 20 of rim 13. For certain applications it may be desirable to install the cover 19 against a flanged portion of the wheel-motor 11 in which the flanged region is turned outwardly rather than inwardly. Another mode for carrying out the invention for such an application is illustrated, somewhat schematically, in FIG. 6. In this instance an outwardly turned flange region 45 on a portion 46 of the wheel-motor 11 in the vicinity of the motor 15 carries a modified cover 47. Cover 47 has a reinforcing member 48 at its perimeter which is adapted to seat against flange region 45. This reinforcing member 48 can be constructed as illustrated in FIG. 3. And reinforcing member 48 will also employ means for altering its configuration. This may take the form of an overcenter toggle mechanism similar to that shown in FIG. 5, except that, the mechanism will be disposed on the outside of the wire loop and adapted to draw the ends of the wire loop together to cause the reinforcing member to grip flanged region 45. Other construction details of cover 47 are the same as cover 19.

What is claimed is:

1. A cover for an electric motor driving a wheel of a wheeled vehicle, which cover is adapted to permit cooling air to be expelled from the motor and for inhibiting the entry of foreign material into the motor, said cover comprising a generally disc-shaped cover sheet of flexible, air impervious material, said cover sheet having an opening therein to permit cooling air to pass therethrough, a foramenous sheet over said cover sheet opening to inhibit the passage of foreign material through said opening, a reinforcing member secured to the perimeter of the cover sheet, and means for expanding and contracting the circumference of said reinforcing member.

2. The cover defined in claim 1 further characterized by having a deflection cover of flexible, impervious material loosely covering the opening in said cover sheet.

3. The cover defined in claim 1 further characterized in that said reinforcing member is a wire loop and said expanding and contracting means is an over-center toggle mechanism.

4. The combination with a wheeled vehicle having an electric motor for driving a wheel of the vehicle, said wheel and said motor constituting a wheel-motor combination, said motor being adapted to have cooling air expelled from the interior thereof through said wheel, of a cover for the motor to prevent foreign material from entering the motor, said cover comprising a sheet of flexible and substantially air impervious material, the perimeter of said cover sheet closely approximating a flanged region of said wheel-motor combination, a reinforcing member carried at the perimeter of said cover sheet, and means associated with said reinforcing member for causing said perimeter of said cover sheet to tightly engage said flanged region, said cover sheet having at least one opening therein to permit the flow of cooling air therethrough.

5. The combination recited in claim 4 further comprising a foramenous sheet over said cover sheet opening to inhibit the passage of foreign material through said openings.

6. The combination recited in claim 4 further characterized in that the flanged region of said wheel-motor combination is an inwardly directed flange on the rim of said wheel and the means associated with said reinforcing member is adapted to enlarge the circumference of said reinforcing member to press the perimeter of said cover sheet into engagement with said wheel rim behind said flange.

7. The combination recited in claim 4 further characterized in that said cover sheet has a deflection cover of flexible, impervious material loosely covering the opening in the cover sheet.

8. The combination recited in claim 5 further characterized in that the flanged region of said wheel-motor combination is an inwardly directed flange on the rim of said wheel and the means associated with said reinforcing member is adapted to enlarge the circumference of said reinforcing member to press the perimeter of said cover sheet into engagement with said wheel rim behind said flange.

9. The combination recited in claim 5 further characterized in that said cover sheet has a deflection cover of flexible, impervious material loosely covering the opening in the cover sheet.

* * * * *